United States Patent [19]

Sennett et al.

[11] Patent Number: 5,332,102
[45] Date of Patent: Jul. 26, 1994

[54] DEVICE FOR DE-SEEDING POPCORN

[75] Inventors: Abbe Sennett, Deerfield; John Chap, Lemont; Paul Green, Deerfield; Ken Streit, Mt. Prospect, all of Ill.

[73] Assignee: Amco Corporation, Chicago, Ill.

[21] Appl. No.: 846,833

[22] Filed: Mar. 6, 1992

[51] Int. Cl.⁵ .................................... B07B 1/49
[52] U.S. Cl. ............................ 209/417; 209/680; 99/323.5; 219/733
[58] Field of Search ............... 206/45, 19; 220/505, 220/554, 529; 99/323.5, 323.11; 209/680, 682, 259, 373, 374, 417; 222/386; 219/725, 732, 733

[56] References Cited

U.S. PATENT DOCUMENTS

| | | | |
|---|---|---|---|
| 1,323,000 | 11/1919 | Bizet | 209/374 |
| 1,909,983 | 5/1933 | Powell | 220/529 |
| 3,917,124 | 11/1975 | Kifer | 222/386 |
| 3,987,941 | 10/1976 | Blessing | 222/386 |
| 4,503,559 | 3/1985 | Warnke | 209/680 |
| 4,889,619 | 12/1989 | Lynch | 209/373 |
| 4,942,277 | 7/1990 | Narberes | 99/323.5 |

Primary Examiner—H. Grant Skaggs
Attorney, Agent, or Firm—Laff, Whitesel, Conte & Saret

[57] ABSTRACT

A device for separating unpopped popcorn kernels from popped popcorn. The device comprises a flat flexible disc having tapering edges, feet or ridges to elevate the disc, and a plurality of holes perforated through the disc. The diameter of the holes will only allow unpopped popcorn kernels to fall through the disc, and not popped kernels. Therefore, regardless of whether the disc is supported at its edge of its feet, there is space for the kernels to fall through.

10 Claims, 2 Drawing Sheets

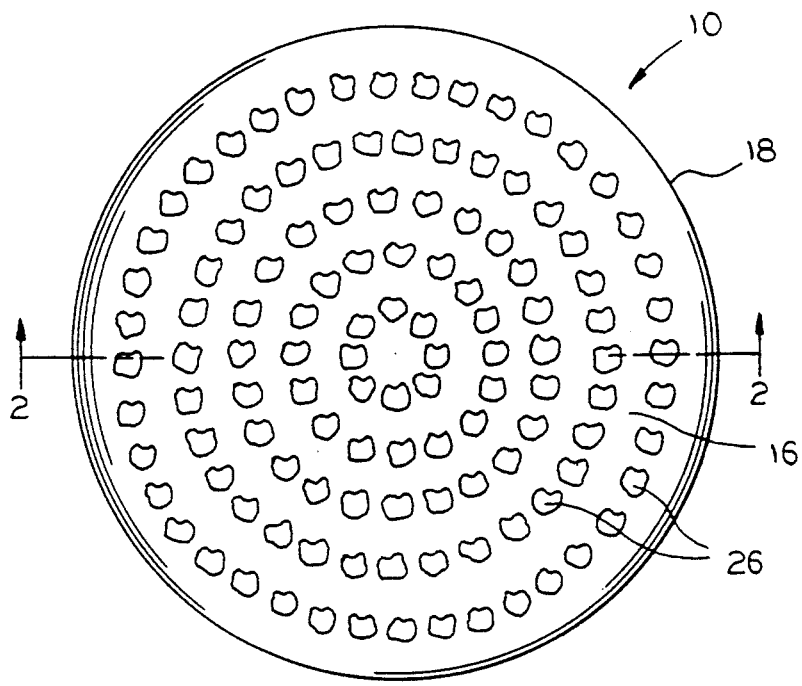
FIG.1
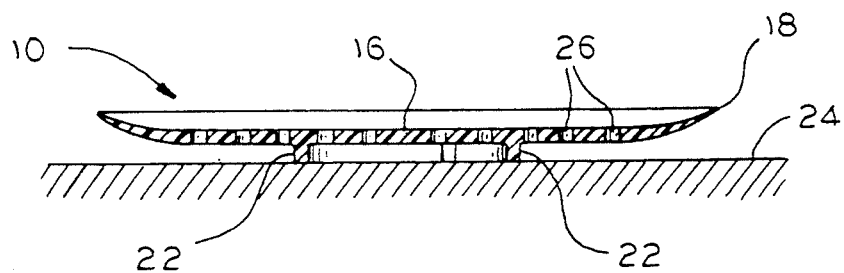
FIG.2
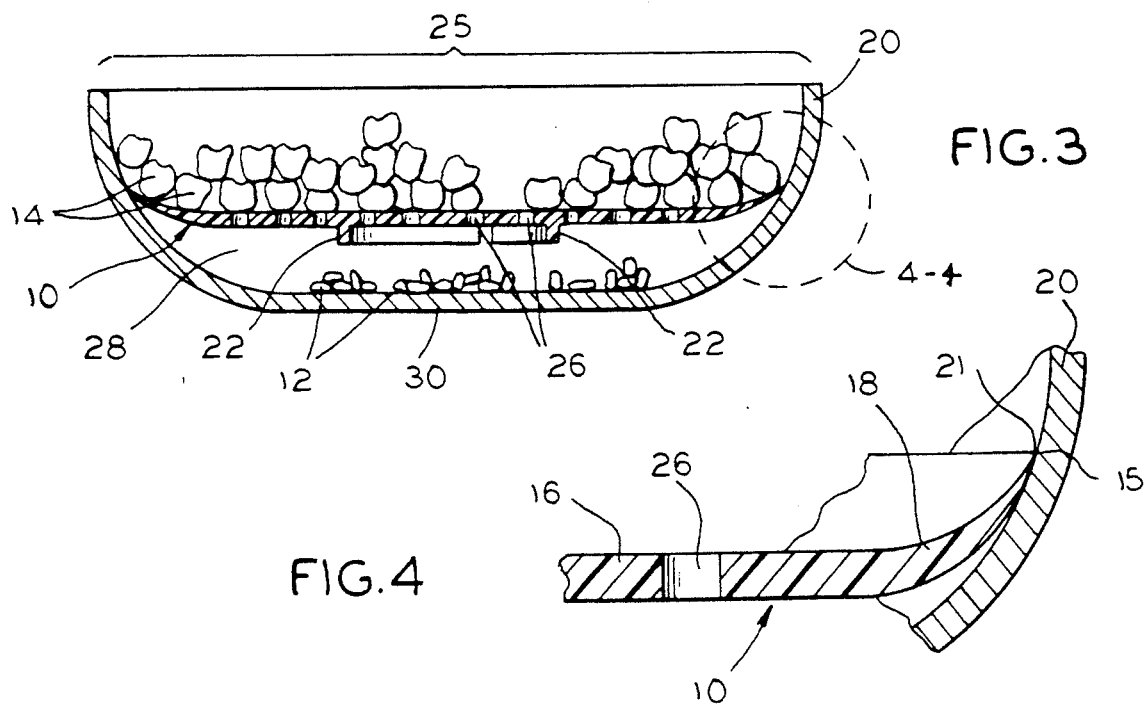
FIG.3
FIG.4 he
DEVICE FOR DE-SEEDING POPCORN

FIELD OF THE INVENTION

This invention relates to devices for de-seeding popcorn. More particularly, this invention relates to devices for separating unpopped popcorn kernels from popped popcorn kernels.

BACKGROUND OF THE INVENTION

For many years, people have enjoyed the taste of popcorn. It is a favorite at movies, carnivals and as a late night snack. Recently, with the increasing use of home video cassette recorders and popcorn poppers, and with the advent of microwave popcorn, people are enjoying more popcorn at home and even at the workplace.

There is a dilemma, however, when eating popcorn, and that is the problem with the unpopped seeds. Invariably, when a batch of popcorn is cooked, not all the kernels pop. Later, when one reaches the bottom of the bowl, he or she is forced to "pick" around the uncooked kernels to find the whole popped kernels. This is irritating, time consuming and if the consumer is not careful when eating a large handful of popcorn, an unpopped kernel may cause a tooth damage.

In response to this problem, different devices have been developed which attempt to separate the popped popcorn kernels from the unpopped popcorn kernels. The solutions include different combinations of bowls and sieves which separate popped and unpopped kernels and even a rotating drum mounted on a platform. These devices, however, present a number of problems.

When using the rotating drum device, the kernels may fall out of the apparatus and spill onto the surrounding areas. The rotating drum also is very large and cumbersome and can be difficult to store and handle.

As for the popcorn de-seeders which are combination bowl/sieves, they too have their limitations. The foremost drawback is that in order to work, the bowl and sieve must be used in tandem. Typically, the sieve is designed to fit only into the provided bowl; or, in some instances, the sieve is actually a part of the bowl. Therefore, if either portion is lost or damaged, the entire device may becomes worthless.

Accordingly, an object of the present invention is to provide a device for separating unpopped popcorn kernels from popped popcorn, the device being usable interchangeably with a variety of different sized bowls.

Another object of the present invention is to provide a device for separating unpopped popcorn kernels from popped popcorn which does not completely remove the unpopped kernels.

Another object of the present invention is to provide a device for not only separating unpopped popcorn kernels from popped popcorn but also for use as a trivet for a container of microwave popcorn.

Yet another object of the present invention is to provide a device, which is compact in size, for separating unpopped popcorn kernels from popped popcorn.

Still another object of the present invention is to provide a device for separating unpopped popcorn kernels from popped popcorn and also for enabling excess butter and salt to be separated from the popped popcorn.

Additional objects and advantages of the invention will become apparent from both the following description and the drawings.

SUMMARY OF THE INVENTION

The present invention accomplishes the foregoing objects by providing a device for separating unpopped popcorn kernels from popped popcorn. The device comprises a disc perforated with a plurality of holes and provided with support feet on its underside, and with a flexible edge that runs around the perimeter of the disc.

The device is designed to work with the user's own bowls, making it more cost and space efficient as compared with current popcorn de-seeders on the market. It is contemplated that the preferred embodiment of the invention is constructed from a reusable, sterilizable, plastic material. Alternate embodiments may also be constructed from a disposable material such as paper or cardboard, or from metal or wood, perhaps combined with flexible rubber edges.

The above, as well as other objects and advantages of the invention, will become apparent from the following detailed description in which reference is made to the accompanying drawings.

BRIEF DESCRIPTION OF THE DRAWINGS

FIG. 1 is a top plan view of a preferred embodiment of the invention;

FIG. 2 is a cross-section of the preferred embodiment of the invention, taken along line 2—2 of FIG. 1;

FIG. 3 is a cross-section of the preferred embodiment of the invention, depicting the device inserted into a bowl;

FIG. 4 is an enlarged partial side view of the preferred embodiment of the invention, taken from circle 4—4 of FIG. 3, and depicting the seal between the edge of the invention and the bowl;

DETAILED DESCRIPTION OF THE PREFERRED EMBODIMENT

Figure 5:
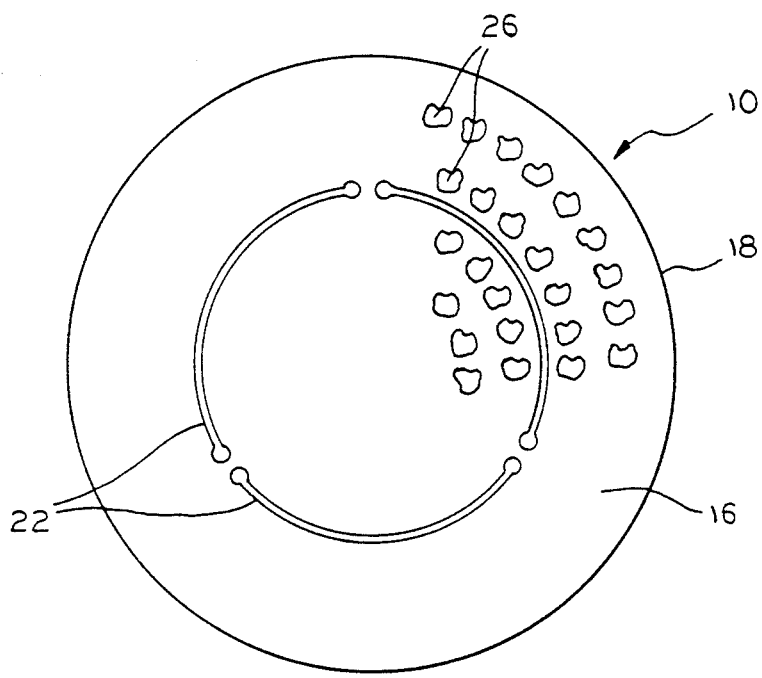
FIG. 5 is a bottom plan view of the preferred embodiment of the invention.

A popcorn de-seeder device 10 provides means for separating unpopped popcorn kernels 12 from popped popcorn kernels 14. The device principally includes a flat, preferably round flexible disc 16 upon which the cooked popcorn 12, 14 is poured. An upturned edge 18 is provided around the perimeter of disc 16 for supporting the disc inside a bowl 20. Edge 18 comprises a curved, tapering outer edge 15 which may flex and conform to the interior shape of the bowl 20. In the preferred embodiment, edge 18 is integrally formed with disc 16. Feet 22 are provided on the underside of disc 16 for elevating the disc 16 above a flat surface 24.

Figure 7:
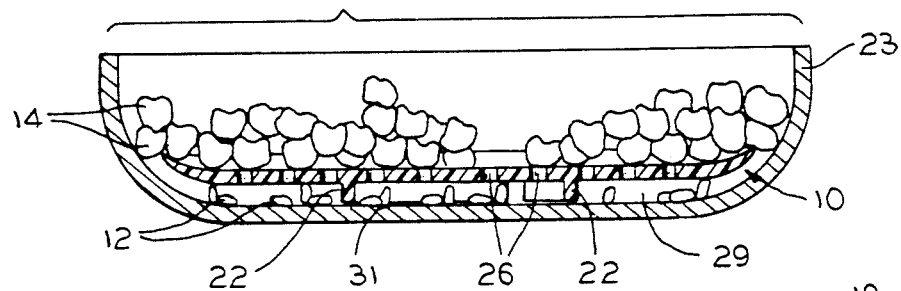
FIG. 7 is a cross-section of the preferred embodiment of the invention, depicting the device inserted in a bowl.

Edge 18, which is primarily for supporting and positioning the de-seeder 10 inside a bowl 20, and disc 16 are constructed from the same flexible plastic material to conform to the shape of the user's bowl. As shown more clearly in FIG. 4, edge 18 bends to more or less mirror the inside curvature 21 of bowl 20. This wedges the de-seeder 10 into a secure position inside bowl 20. As seen in FIGS. 3 and 7, the de-seeder 10 is designed to fit inside almost any type of bowl 20, 23 which may be supplied by the user, so long as the diameter at the mouth 25 of the bowl 20, 23 is greater than that of the device.

On the underside or bottom of the de-seeder 10, feet 22 protrude downwardly from the disc 16 (FIGS. 2, 3, 5 and 7). The feet 22 are preferably arranged in a circular pattern as shown in FIG. 5, and are positioned on the underside of disc 16 between concentric rows of holes 26 so as not to block or impede the unpopped kernels 12 from falling through holes 26. The feet 22 enable the de-seeder 10 to have a two-part functionality. First, the feet 22 insure a minimum elevation of the disc 16 above the bottom of the bowl 23. Second, the feet 22 enable the de-seeder 10 to function as a dish or trivet, as for supporting a bag of microwave popcorn when placed in a microwave oven. The circular configuration of feet 22 provides a stable support for disc 16 so that the disc will not be thrown off-balance if the bowl 20 and disc 16 are gently shaken to facilitate separation of the unpopped kernels from the popped popcorn.

Ideally, as seen in FIG. 3, the de-seeder 10 is used with a bowl 20 having an opening 25 which is larger than the diameter of disc 16, but then tapers to a bottom 30 which is smaller in diameter than that of disc 16. As shown in FIGS. 3 and 4, this enables the user to securely wedge the de-seeder 10 inside the bowl 20 because the flexible disc edge 18 bend to conform to the shape of the bowl 20. If, however, the bottom 31 of the bowl 23 is larger than the de-seeder 10, as shown in FIG. 7, feet 22 will elevate the disc 16 above the bottom of the bowl 23.

The second function of the feet 22 is to enable the device to act as a trivet. For example, it may support a bag 34 of microwave popcorn in a microwave oven 32. Popcorn seems to cook more evenly in a microwave when hot air can freely circulate around it. Thus, if a popcorn bag 34 is placed on top of the de-seeder 10, as shown in FIG. 6, the hot air is able to circulate completely around the bag 34.

In the preferred embodiment of the invention, it is desireable that main disc 16, curved tapering edge 18 and feet 22 are made from the same material. In one embodiment, this is a food grade, reusable, sterilizable plastic material. An example of this material is Petrothene, No. PP8762-HR, a polypropylene Resin manufactured by Quantum Plastic, Inc., of Cincinnati, Ohio.

Figure 8:
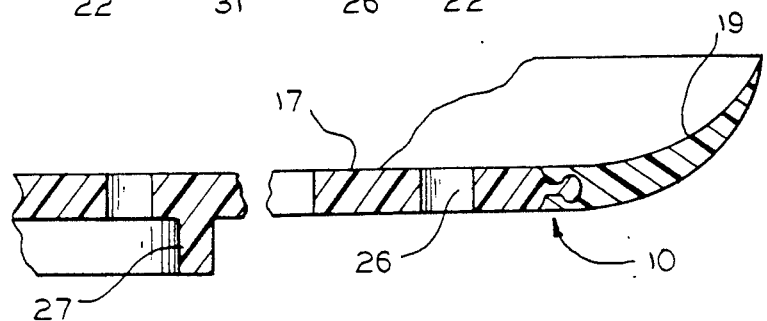
FIG. 8 is a partial cross-section of an alternative embodiment of the invention.

An alternative embodiment of the invention, as shown in FIG. 8, may be made in which tapering edge 19 and main disc 17 are formed from different materials. In such instances, disc 17 and feet 27 may be wood or hard plastic, and edge 19 may be a flexible plastic or rubber. In yet another embodiment, the entire device may be manufactured from a disposable biodegradable material such as paper or cardboard.

Figure 6:
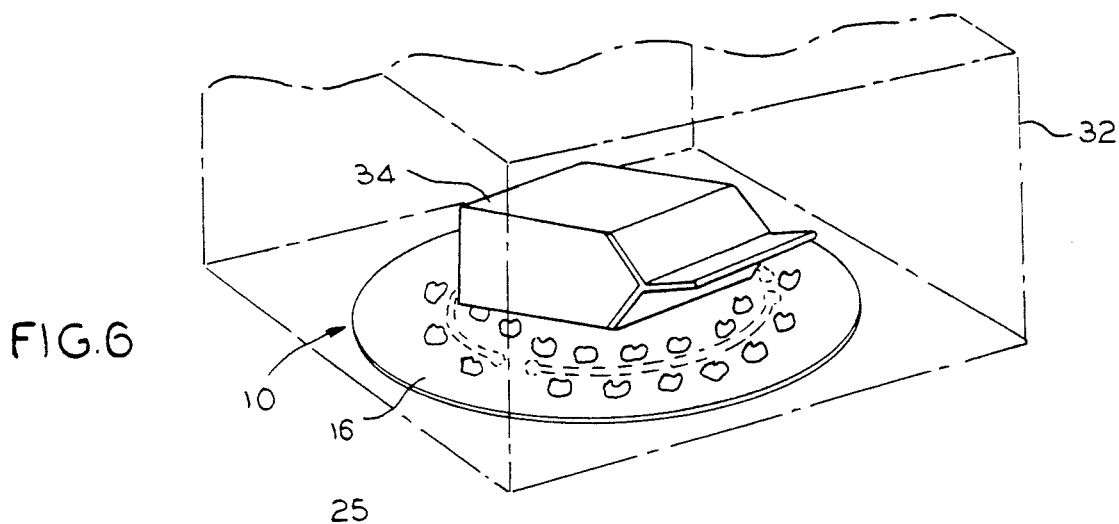
FIG. 6 is a perspective view of the preferred embodiment of the invention depicting the device in a microwave oven supporting a bag of popcorn.

As shown in FIGS. 1, 2 and 6, means for separating the popped kernels 14 and unpopped kernels 12 includes a plurality holes 26 which perforate the main body of disc 16. These holes 26, which may be cut in the shape of popped popcorn kernels, if desired, are similar in size and preferably may be arranged in concentric circle patterns which become larger as the patterns radiate outwardly from the center of the disc 16. The holes 26 themselves are large enough for an unpopped kernel 12 to fall through, but are small enough to impede the passage of any popped kernels 14.

In other embodiments of the invention, the holes 26 may be larger, smaller or shaped differently, so that different kinds popcorn may be cooked and separated.

With the components of the de-seeder 10 explained, the operation of the invention may now be described. As seen in FIG. 3, the popcorn de-seeder 10 is placed inside bowl 20 where the popcorn kernels 12, 14 are to be separated. Edge 18 bends to conform to the shape of the bowl 20, wedging it securely in place, thus stopping the de-seeder 10 from falling to the bottom 30 of the bowl 20.

The cooked popcorn 12, 14 is then poured into the bowl 20 on top of the de-seeder 10 and gently shaken. This shaking causes the unpopped kernels 12 to fall through the holes 26 and into space 28 created between the de-seeder 10 and the bowl's bottom 30. As stated above, if the diameter of the bottom 31 of the bowl 23 is larger than the diameter of the de-seeder 10, as seen in FIG. 7, feet 22 support and elevate disc 16 above the bottom 31, creating space 29 in which the unpopped kernels 12 may fall. As previously mentioned, the circular configuration of feet 22 provides a stable support for disc 16 in such situations to help prevent the disc 16 from being thrown off-balance.

When using the de-seeder 10 as a support for a bag of microwave popcorn 34 as seen in FIG. 6, the de-seeder is placed inside the microwave oven 32. The popcorn bag 34 is then placed on top of the disc 16 and the oven 32 is activated. Feet 22 elevate the de-seeder 10, allowing hot air to fully circulate around and underneath the bag 34. This creates a more evenly cooked product, resulting in fewer unpopped popcorn kernels. Once the popcorn is finished popping, the de-seeder 10 may be used to separate the popped 14 and unpopped 12 kernels as described above.

While the principles of the invention have been described above in connection with specific embodiments, these descriptions are intended only by way of example and not as a limitation on the scope of the invention, which is stated more broadly in the appended claims. Therefore, the claims are to be construed to cover all equivalents.

We claim:

1. A device for separating unpopped popcorn kernels from popped popcorn comprising:
    a flat disc having a tapering perimeter surface for wedging the disc inside of a bowl with a tapering diameter;
    the disc having holes formed therein, said holes having a size which unpopped popcorn kernels may pass through, said holes further having a size which popped popcorn cannot pass through; and
    means for supporting an elevating said disc above the bottom surface of said bowl, said means for supporting and elevating said disc extending downwardly from the underside of said disc and located inwardly from said perimeter.

2. The device of claim 1 wherein said tapering perimeter surface is integral with said flat disc.

3. The device of claim 2 wherein said disc and said tapering perimeter surface are constructed from a reusable, sterilizable material.

4. The device of claim 3 wherein said reusable, sterilizable material is a food grade flexible plastic.

5. The device of claim 1 wherein said tapering perimeter surface is constructed from a flexible rubber-like material.

6. The device of claim 1 wherein said means for supporting and elevating said disc further comprises feet which are integrally formed with said disc.

7. The device of claim 6 wherein said feet are constructed from a reusable, sterilizable material.

8. The device of claim 1 wherein said holes are irregularly shaped.

9. A multiple purpose flat disc having a plurality of holes therein, said holes being larger than unpopped popcorn kernels and smaller than popped popcorn kernels, means on said disc for supporting the periphery of the disc against the inside of a bowl with a tapering diameter and means for supporting the bottom of the disc in an elevated position so that there is space beneath said disc to receive said unpopped kernels, said means for supporting and elevating the bottom of said disc extending downwardly from the underside of said disc and located inwardly from said perimeter.

10. The disc of claim 9 wherein said means for supporting and elevating said disc comprises a plurality of feet that are integrally formed with said disc.

* * * * *